(12) United States Patent
Randolph et al.

(10) Patent No.: US 8,753,141 B2
(45) Date of Patent: Jun. 17, 2014

(54) ADAPTER FOR CONNECTING A HARNESS TO MAGNET WIRES

(75) Inventors: Kurt A. Randolph, Etters, PA (US);
Paul W. McDowell, Fishers, IN (US);
Jeffrey R. Ruth, Middletown, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 161 days.

(21) Appl. No.: 13/545,439

(22) Filed: Jul. 10, 2012

(65) Prior Publication Data

US 2014/0015357 A1    Jan. 16, 2014

(51) Int. Cl.
*H01R 4/24* (2006.01)
(52) U.S. Cl.
USPC ........................................................ 439/398
(58) Field of Classification Search
USPC .................. 439/398, 404, 441, 907; 310/71
See application file for complete search history.

(56) References Cited

U.S. PATENT DOCUMENTS

| | | | |
|---|---|---|---|
| 3,979,615 A * | 9/1976 | Neff ................................ | 310/71 |
| 4,557,544 A | 12/1985 | Esser | |
| 4,649,304 A * | 3/1987 | Atherton et al. ................ | 310/71 |
| 4,757,602 A | 7/1988 | Evenson | |
| 5,447,455 A * | 9/1995 | Plosser ......................... | 439/863 |
| 5,633,542 A * | 5/1997 | Yuhi et al. ............... | 310/40 MM |
| 5,782,652 A | 7/1998 | Feher et al. | |
| 5,915,988 A | 6/1999 | Bitsch et al. | |
| 6,800,973 B2 | 10/2004 | Futami et al. | |
| 7,374,449 B2 | 5/2008 | Demuth et al. | |
| 7,556,543 B2 | 7/2009 | Weber | |

OTHER PUBLICATIONS

AMP, Standard MAG-MATE Magnet Wire Terminals, Catalog 1307612, Revised Jul. 2001, Courtesy of Steven Engineering, Inc., 230 Ryan Way, South San Francisco, CA, 15 pages.
Tyco Electronics, MAG-MATE Series 300 Terminals, Application Specification 114-2046, Apr. 9, 2010, Rev V, Tyco Electronics Corporation, Berwyn, PA, 12 pages.
Tyco Electronics, Power Double Lock (PDL) Connectors (Wire-to-Board and Wire-to-Wire), Catalog 82181, Rvised Apr. 2008, Tyco Electronics Corporation, Berwyn, PA, 23 pages.

* cited by examiner

*Primary Examiner* — Phuong Dinh

(57) ABSTRACT

An adapter for connecting magnet wires to a harness. A first housing of the adapter is secured to a housing of a motor assembly. The first housing has first terminals which are secured in terminal receiving passages of the first housing. The first terminals have insulation displacing slots and mating portions, with the insulation displacing slots configured for receiving magnet wires therein and the mating portions configured to mate with contacts of a mateable connector attached to the harness. A second housing of the adapter has contact receiving passages with receiving portions which configured to receive the mating portions of the first terminals and mateable connector receiving passages extending from the receiving portions. The mateable connector receiving passages dimensioned to receive the contacts of a mateable connector therein.

20 Claims, 5 Drawing Sheets

ADAPTER FOR CONNECTING A HARNESS TO MAGNET WIRES

FIELD OF THE INVENTION

The present invention is directed to an electrical connector assembly for providing electrical connection to magnet wires.

BACKGROUND OF THE INVENTION

As the number of electrical appliances increases, the use of small electrical motors also increases. Motors are typically incorporated into appliances such as vacuum cleaners, kitchen appliances, and any other power accessory used in home or business.

Magnet wires are typically connected to terminals having insulation displacement slots, such as the terminals from Applicant's Mag-Mate electrical connectors. The terminals have two insulation displacement slots which cut through the tough outer varnish coating on the magnet wires providing good electrical connection to the magnet wire. The Mag-Mate terminal can either be connected to a plug terminal, for example by a leaf spring contact or, alternatively be connected to a receptacle terminal, for example by an integral tab contact extending in the opposite direction from the insulation displacement slots.

In order to interconnect with a mating lead, various means for lead connection have been provided, such as poke-in latches for directly receiving the wire, tabs for receptacle terminals, posts for wrapping wire thereabout, wire barrels or solder tabs. Contacts of this type have performed admirably and offer many advantages. However, with these prior art terminals for connecting magnet wires to lead wires, it has been difficult to effectively connect the magnet wires to harnesses and the like which are used in appliances and other such devices. Therefore, as the industry becomes more and more sophisticated, it becomes necessary to provide electrical contacts that further enhance the assembly processes of components and allows for ease of repair and replacement. In addition, as the complexity of the electrical appliances and the like increases, it is beneficial to connect the motor and components in series through the use of harnesses. However, due to the configuration of the magnet wire terminals, the connection of the harnesses to the terminals has been difficult.

It would, therefore be beneficial to provide an electrical connector assembly which allows harnesses to be easily and effectively connected to the magnet wire terminals. In so doing, the harnesses may be easily disconnected and reconnected to allow for ease of repair or replacement of the individual components during assembly and in the field.

SUMMARY OF THE INVENTION

An exemplary embodiment is directed to an adapter for connecting magnet wires to a harness. A first housing of the adapter is secured to a housing of a motor assembly. The first housing has first terminals which are secured in terminal receiving passages of the first housing. The first terminals have insulation displacing slots and mating portions, with the insulation displacing slots configured for receiving magnet wires therein and the mating portions configured to mate with contacts of a mateable connector attached to the harness. A second housing of the adapter has contact receiving passages with receiving portions which configured to receive the mating portions of the first terminals and mateable connector receiving passages extending from the receiving portions. The mateable connector receiving passages dimensioned to receive the contacts of a mateable connector therein. The adapter allows the magnet wires and the harness to be electrically connected.

An exemplary embodiment is directed to an electrical connector assembly having a first housing and a cover. The first housing includes first terminals which are secured in terminal receiving passages of the first housing. The first terminals have insulation displacing slots and mating portions, with the insulation displacing slots being configured for receiving magnet wires therein and the mating portions being configured to mate with contacts of a mateable connector. The cover includes contact receiving passages having receiving portions which are configured to receive the mating portions of the first terminals. Mateable connector receiving passages extend from the receiving portions and are dimensioned to receive the contacts of a mateable connector therein. The electrical connector assembly provides an electrical connection between the magnet wires and a harness connected to the mateable connector.

An exemplary embodiment is directed to an electrical connector assembly for providing an electrical connection between magnet wires and a harness connected to a mateable connector. A first housing of the electrical connector has first terminals which are secured in terminal receiving passages of the first housing. The first terminals are configured for receiving a magnet wires therein and for mating with contacts of the mateable connector. A cover of the electrical connector has contact receiving passages with receiving portions to receive portions of the first terminals and mateable connector receiving passages to receive the contacts of a mateable connector therein. The electrical connector has a bi-metal protector which engages respective first terminals.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

In the following detailed description, numerous specific details are set forth in order to provide a thorough understanding of various embodiments. However, those skilled in the art will understand that the embodiments may be practiced without these specific details, that the embodiments are not limited to the depicted embodiments, and that the embodiments may be practiced in a variety of alternative embodiments. In other instances, well known methods, procedures, and components have not been described in detail.

Further, various operations may be described as multiple discrete steps performed in a manner that is helpful for understanding the embodiments. However, the order of description should not be construed as to imply that these operations need be performed in the order they are presented, or that they are even order-dependent. Moreover, repeated usage of the phrase "in an embodiment" does not necessarily refer to the same embodiment, although it may. Lastly, the terms "comprising," "including," "having," and the like, as used in the present application, are intended to be synonymous unless otherwise indicated.

Figure 2:
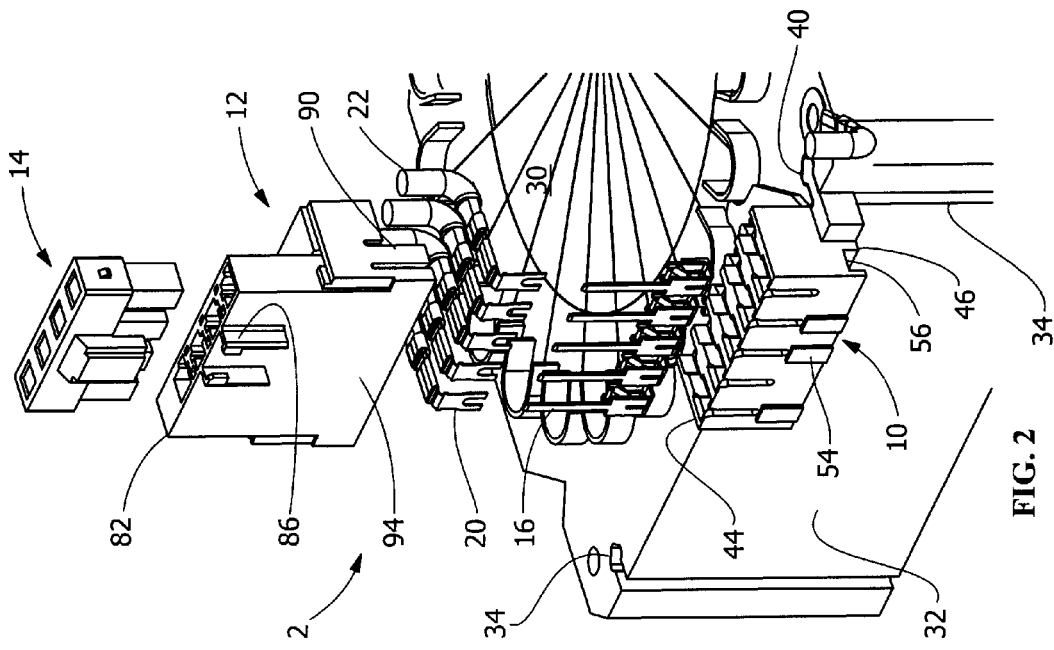
FIG. 2 is an exploded back perspective view of the exemplary electrical connector assembly of FIG. 1.
Figure 1:
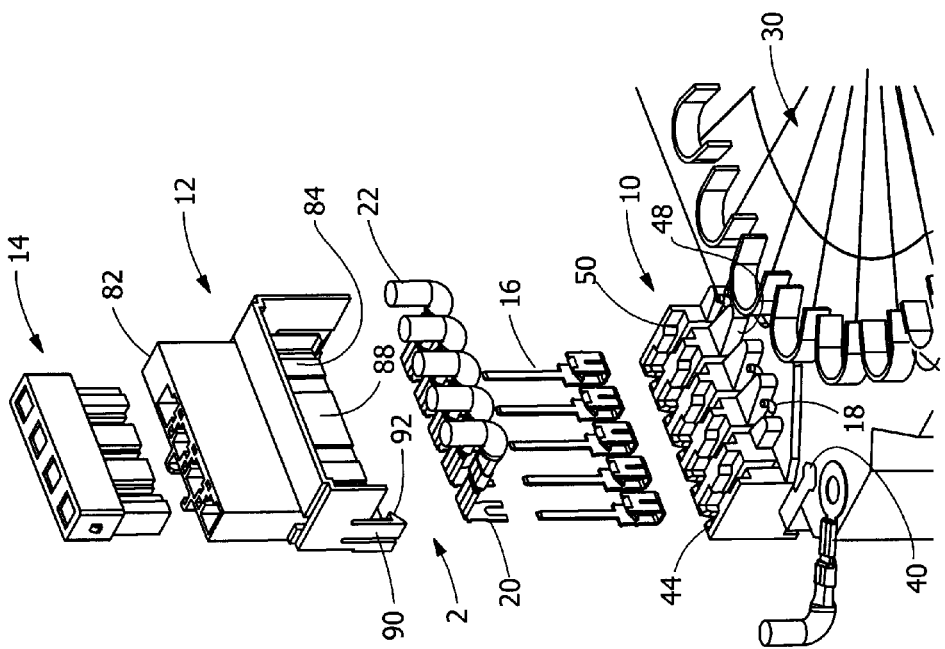
FIG. 1 is an exploded front perspective view of an exemplary electrical connector assembly.
Figure 3:
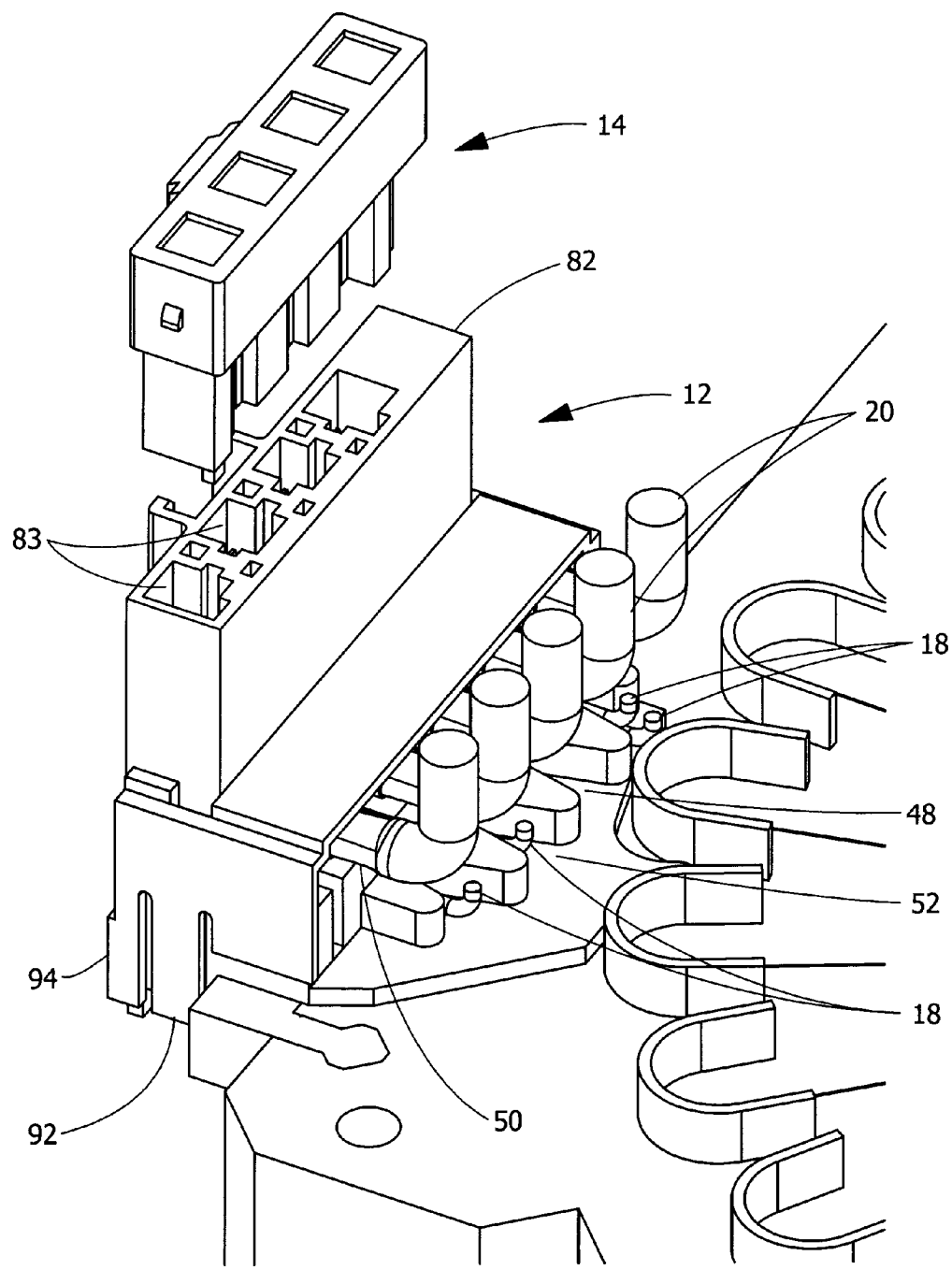
FIG. 3 is a perspective view of the assembled exemplary electrical connector assembly of FIG. 1.

Referring to FIGS. 1 through 3, an exploded view of an exemplary embodiment of an adapter or electrical connector assembly 2 is illustrated. The connector assembly 2 has a first connector housing 10 and a cover housing or cap housing adaptor 12. The cover housing 12, which is also referred to as the second housing, is designed to mate with a mateable connector 14. The mateable connector 14 has contacts therein (not shown) to provide a mating connection with terminals 16 of the connector assembly 2. Opposed ends of the contacts of the mateable connector 14 are electrically engaged to a wire harness or other electrically conductive members, as is known in the art. One example of the mateable connector 14 is a Power Double Lock connector sold by TE Connectivity.

The terminals 16 are insulation displacement terminals, such as, but not limited to, Mag-Mate terminals. The insulation displacement terminals 16 will be electrically connected to the magnet wires 18 by displacing the tough outer varnish coating of the magnet wires 18. The assembly 2 also includes terminals 20 which terminate lead wires 22.

The first connector housing 10 is designed to be secured to a motor housing 30, as is best shown in FIGS. 1 and 2. Walls 32 of the motor housing have openings or recesses 34 into which projections 40 of the first connector housing 10 are received and secured, by friction, adhesives or other means. The motor housing also includes the magnet wire windings (not shown) which include the magnet wires 18 intertwined in order to form the motor.

The first connector housing 10 has projections 40 which extend from the housing to cooperate with the openings 34 of the motor housing 30 to maintain the connector housing 10 in position relative to the motor housing 30. In the exemplary embodiment shown, the projections 40 are provided on either side of the connector housing 10 and extend downward to proximate or beyond the bottom surface of the connector housing 10. The projections 40 are dimensioned to create a frictional engagement with the openings 34 when the projections 40 are inserted into the openings 34.

First connector housing 10 has terminal receiving passages 42 (FIG. 4) which extend from a first or top surface 44 toward a second or bottom surface 46. Top and bottom are used for the embodiment shown, as the first connector housing 10 is oriented in a vertical manner, however, other orientations of the first connector housing 10 may be used. The terminal receiving passages 42 are configured to receive the terminals 16 therein. Extending from the terminal receiving passages 42 are magnet wire receiving passages 48. In the exemplary embodiment, the magnet wire receiving passages 48 have a longitudinal axis which is essentially perpendicular to the longitudinal axis of the terminal receiving passages 42, although other orientations are possible. Lead-in surface may be provided proximate the magnet wire receiving passages 48 to help guide the magnet wires 18 into proper position in the passages 48.

Lead wire receiving passages 50 also extend from the terminal receiving passages 42. In the exemplary embodiment, the lead wire receiving passages 50 have a longitudinal axis which is essentially perpendicular to the longitudinal axis of the terminal receiving passages 42, although other orientations are possible. The lead wire receiving passages 50 are positioned above the magnet wire receiving passages 48, as best viewed in FIG. 3.

Figure 4:
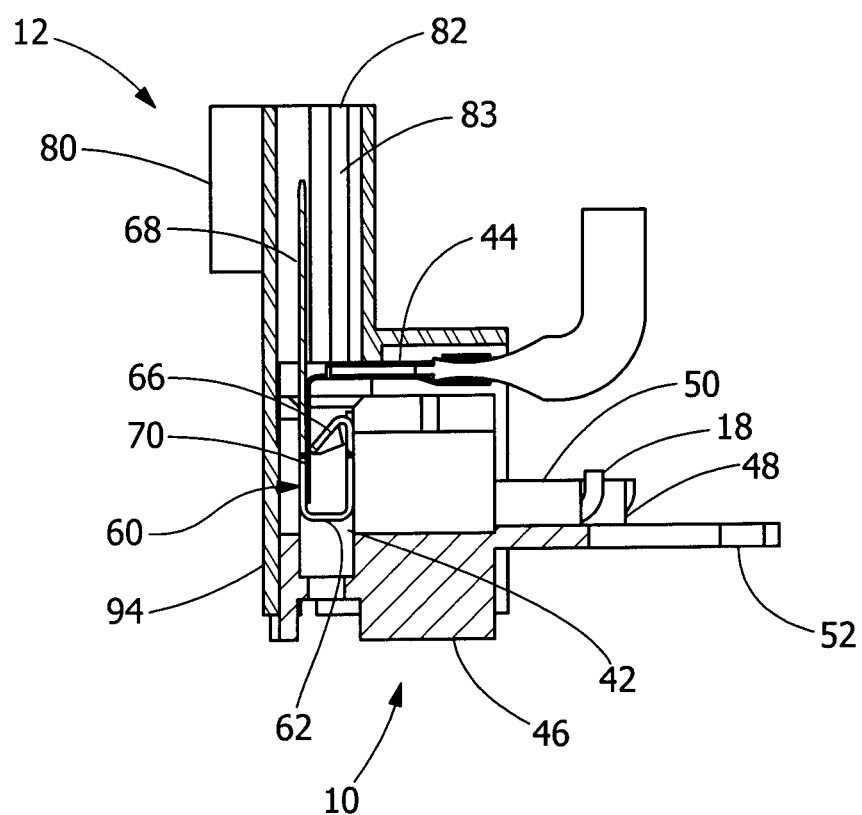
FIG. 4 is a cross sectional view showing the fully assembled exemplary electrical connector assembly of FIG. 3.

An insulating member or flange 52 projections from the first housing 10. As best shown in FIGS. 3 and 4, the insulating flange 52 is positioned below the magnet wire receiving passages 48. The insulating flange 52 provides electrical insulation between the magnet wires 18 and the motor housing 30. In addition, the insulating flange 52 provides a surface of the first connector housing 10 which can rest on the motor housing 30, thereby providing increased stability to the first connector housing 10 and the connector assembly 2.

In the embodiment shown, the first connector housing 10 has trim blocks 54 which are positioned proximate the end of the magnet wire receiving passages 48. The trim blocks 54 are employed during the termination and cutting of the magnet wires 18, as is known in the industry. Recesses 56 are provided on either side of the first connector housing 10. The recesses 56 are positioned proximate the bottom surface 46 and are dimensioned to receive latching projections of the cover housing 12.

Figure 5:
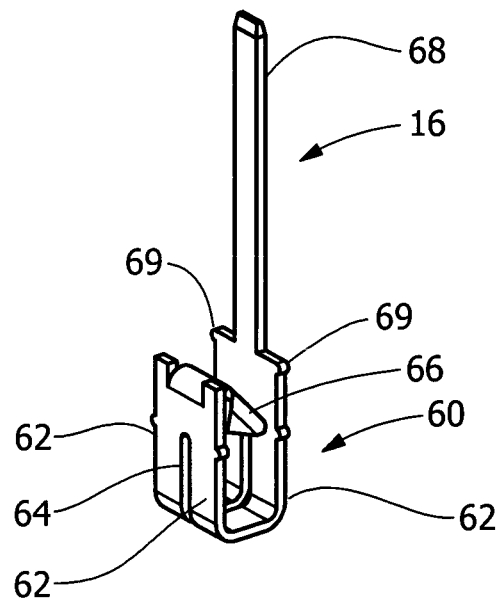
FIG. 5 is a perspective view of a first terminal of the exemplary electrical connector assembly.

The terminals 16 are of standard construction and well known in the art. Terminals 16 have generally box shaped portions 60. Legs 62 of the box shaped portions 60 have slots 64 therebetween. The slots 64 are disposed on both sides of the box portions 60 of the terminals 16. Further, the terminals have barbs 69 which are used to secure the terminals 16 within the first housing 10. The box portions 60 of the terminals 16 have receptacle portions which include leaf contacts 66 which are shown more fully in FIGS. 4 and 5. The leaf contacts 66 are resilient spring contacts designed to resiliently engage the terminals 20 providing both good electrical contact and good wiping action against the terminals 20. Mating portions or tabs 68 extend from the box portions 60. The tabs 68 are dimensioned to make electrical connection with the contacts of the mateable connector 14. Barbs 69 extend from the sides of box portion 60 to cooperate with the terminal receiving passages 42.

Figure 6:
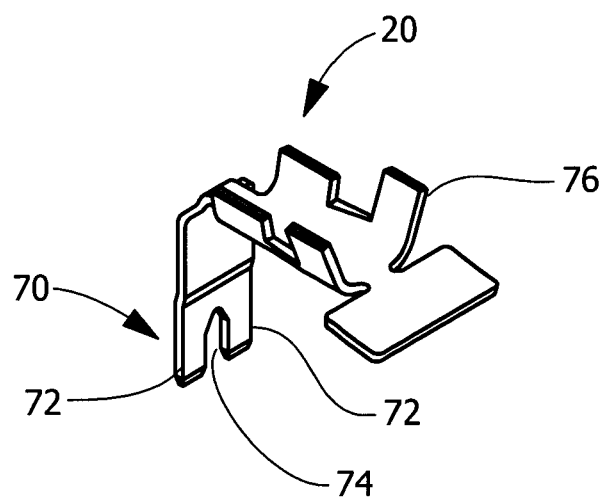
FIG. 6 is a perspective view of a second terminal which is inserted into the exemplary electrical connector assembly.

The terminals 20 are designed to be received within the connector housing 10. The terminals have a tab poke-in portion 70, as is shown in FIGS. 4 and 6. The tab poke-in portion 70 has two legs 72 with a recess 74 therebetween. The purpose of the two legs 72 and the recess 74 will be described more fully later. In the embodiment shown, the tab poke-in portion 70 is directed 90 degrees from a wire termination section 76 of the terminal 20, although other configurations may be used. The wire termination section 76 cooperates with the lead wires 22 to terminate the lead wires thereto. Termination of the lead wires 22 to the termination section 76 may be done by crimping, soldering or other know methods.

The cover housing 12 has contact receiving passages 80 which extend from a first or top surface 82 to a second or bottom surface 84. Top and bottom are used for the embodiment shown, as the cover housing 12 is oriented in a vertical manner, however, other orientations of the cover housing 12 may be used. The contact receiving passages 80 have receiving or slot portions 81 which are dimensioned to receive the tabs 68 of terminals 16 through the bottom surface 84. The slot portions 81 cooperate with the tabs 68, as will be more fully described. The contact receiving passages 80 also have mating connector receiving portions 83 which are dimensioned to receive portions of the mateable connector 14 and contacts thereof. The centerline spacing of the mating connector receiving portions 83 is configured to match the centerline spacing of the contact of the mateable connector 14. As shown in FIG. 4 of the exemplary embodiment, the mating connector receiving portions 83 have a larger cross-sectional area than the slot portions 81, thereby allowing for the insertion of the mateable connector therein.

A latch receiving area 86 is provided proximate the top surface 82. The latch receiving area 86 is dimensioned to receive a latch from the mateable connector therein. The cover housing 12 has a first connector receiving area 88 proximate the bottom surface 84. The receiving area 88 is dimensioned to receive a portion of the first connector 10 therein. Resilient latch arms 90 extend from either side of the cover housing 12. The resilient latch arms 90 having latching projections 92 which cooperate with the recesses 56 of the first connector housing 10 when the cover housing 12 is assembled to the first connector housing 10. A portion 94 of the front wall of the cover housing 12 extends beyond the bottom surface 84 to cover and insulate the exposed ends of trimmed magnet wires at trim blocks 25.

Figure 7:
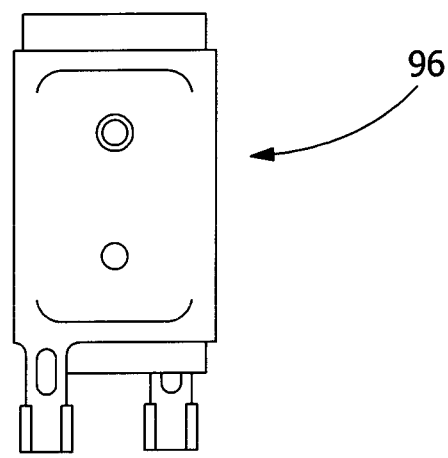
FIG. 7 is a perspective view of a protector housed in the exemplary electrical connector assembly.
Figure 8:
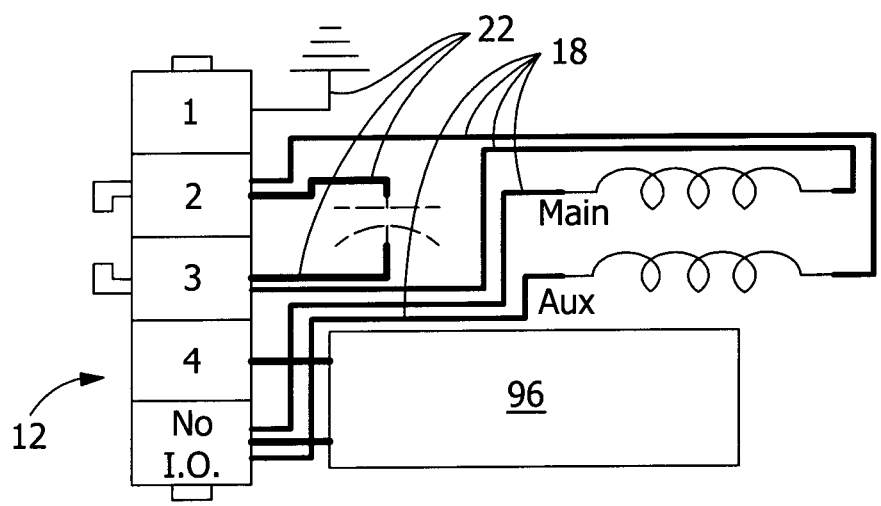
FIG. 8 is a schematic diagram of the circuit of the exemplary electrical connector.

A bi-metal protector 96, FIGS. 7 and 8, may be provided to cooperate with select terminals of the electrical connector assembly 2. The protector 96 may use poke-in terminals as described above, stranded lead wires terminated with a crimp style terminals, or any other type of termination.

FIG. 4 shows a cross sectional view of the assembled electrical connector assembly 2 attached to the motor housing 30. When assembled, the magnet wires 18 are positioned in passages 48 and terminated in slots 64 of terminals 16. The legs 62 of the terminals 16 penetrate the outer tough varnish coating of the magnet wires 18, providing a good electrical connection therebetween. The barbs 69 bite into the walls of the terminal receiving passages 42 thereby securing the terminals 16 within the terminal receiving passageways 42. The projections 40 of the first connector housing 10 are secured within the openings 34 on the motor housing 30 to maintain the first connector housing 10 in position. As previously described, the insulating flange 52 cooperates with a surface of the motor housing 30 to provide increased stability to the first connector housing 10 and the connector assembly 2. The insulating flange 52 also isolates the magnet wires 18 from the motor housing 30 thereby helping to protect the connector assembly 2 from the windings of the motor housing 30.

The terminals 20 attached to the end of the lead wires 22 are inserted into the box portions 60 of the terminals 16 and are maintained therein by the resilient forces applied by the leaf contacts 66. The recesses 74 of the poke-in portions 70 allow the magnet wires 18 to be received between the legs 72 of the poke-in portions, providing good contact with the leaf contacts 66 while also fitting around the magnet wires 18. The interconnection of the magnet wires 18 with the lead wires 22 through the terminals 16 and terminals 20 provides the electrical connection between the lead wires and the motor.

Cover housing 12 is positioned over first connector housing 10 and secured thereto by the positioning of the latching projections 92 of the latch arms 90 positioned in recesses 56 of the first connector housing 10. In this position, the latch arms 90 are in an unstressed position. In order to remove the cover housing 12, a significant force is required to cause the latch projections 92 to resiliently move out of the recesses 56. The operation of the latch arms 90 is known in the industry.

The receiving area 88 of the cover housing 12 is positioned over the wire receiving passages 48, 50 and the associated wires 18, 22 and terminals 16, 20. In so doing, the receiving area 88 provides shielding and protects these members from environmental hazards. In addition, the portion 94 of the cover housing 12 extends over the trim blocks 54 of the first connector housing 10 and the associated ends of the magnet wires 18 providing shielding and protection from environmental hazards.

Tabs 68 of terminals 16 extend into the contact receiving passages 80 of the cover housing 12. The tabs 68 extend through the slots 81. As the slots 81 are dimensioned to have similar dimensions to the tabs 68, the slots 81 serve to provide support to the tabs 68. With the tabs 68 of terminals 16 secured within the contact receiving passages 80, the tabs 68 are accessible to mate with the contacts of the mateable connector 14.

As best shown in FIG. 8 of the exemplary embodiment, five lead wires 22 and magnet wires 18 are terminated in the connector assembly 2. However, only four contact receiving passages 80 extend through the top surface 82 of the cover housing 12. This allows one position to be used as a commoning connection. In the exemplary embodiment shown, the first four positions P1-P4 all have passages 80 which allow for connection to the mateable connector 14. Position P1 is connected to a ground lead wire. Position P2 is connected to both a magnet wire (connected to auxiliary winding) and a lead wire (capacitor lead). Position P3 is connected to both a magnet wire (connected to main winding) and a lead wire (capacitor lead). Position P5 is connected to two magnet wires (the first connected to the main winding and the second connected to an auxiliary winding) and a bi-metal protector (such as, but not limited to a CP17AM thermal protector). This position P5 is used as a splice function only. Position 4 is connected to the bi-metal protector 96.

The use of the connector assembly 2 allows for the interconnection of magnet wire terminations on electric motors with harnesses equipped with connectors. The assembly provides a secure, shielded interconnection between the motor and the harness. The assembly also allows for the easy repair and replacement of the motor, as the mateable connector of the harness can be easily removed and used over numerous cycles.

The connector assembly and many of its attendant advantages will be understood from the foregoing description. While the written description has referred to a preferred embodiment, it will be understood by those skilled in the art that various changes and modifications may be made and equivalents may be substituted for elements thereof without sacrificing its material advantages or without departing from the patentable scope as defined by the claims. Therefore, it is intended that the patentable scope not be limited to the particular embodiments disclosed as the best mode contemplated, but rather other embodiments are intended to be within the scope of the claims if they have structural elements that do not differ from the literal language of the claims, or if they include equivalent structural elements with insubstantial differences from the literal language of the claims.

What is claimed is:

1. An adapter for connecting magnet wires to a harness, the adapter comprising:

a first housing secured to a housing of a motor assembly, the first housing having first terminals which are secured in terminal receiving passages of the first housing, the first terminals having insulation displacing slots and mating portions, the insulation displacing slots configured for receiving magnet wires therein, the mating portions configured to mate with contacts of a mateable connector attached to the harness;

a second housing having contact receiving passages, the contact receiving passages having receiving portions which configured to receive the mating portions of the first terminals, mateable connector receiving passages extending from the receiving portions, the mateable connector receiving passages dimensioned to receive the contacts of a mateable connector therein;

whereby the adapter allows the magnet wires and the harness to be electrically connected.

2. The adapter of claim 1, wherein the first housing has projections which extend from the first housing to cooperate with openings of the motor assembly on which the magnet wires are disposed to maintain the first housing in position relative to the motor assembly.

3. The adapter of claim 2, wherein the first housing has magnet wire receiving passages which extend from the terminal receiving passages, each magnet wire receiving passage having a longitudinal axis which is essentially perpendicular to the longitudinal axis of a respective terminal receiving passage.

4. The adapter of claim 3, wherein lead wire receiving passages extend from the terminal receiving passages, the lead wire receiving passages having longitudinal axes which are essentially perpendicular to the longitudinal axis of the terminal receiving passages, the lead wire receiving passages positioned above the magnet wire receiving passages to receive lead wires therein.

5. The adapter of claim 4, wherein an insulating flange projects from the first connector housing, the insulating flange being positioned below the magnet wire receiving passages.

6. The adapter of claim 5, wherein the first terminals have resilient spring contacts configured to resiliently engage second terminals attached to the lead wires.

7. The adapter of claim 1, wherein the second has a first connector receiving area to receive a portion of the first connector, resilient latch arms extend from either side of the cover, the resilient latch arms having latching projections which cooperate with recesses of the first housing when the cover is assembled to the first connector housing.

8. The adapter of claim 1, wherein a bi-metal protector is provided.

9. An electrical connector assembly, comprising:
a first housing having first terminals which are secured in terminal receiving passages of the first housing, the first terminals having insulation displacing slots and mating portions, the insulation displacing slots configured for receiving magnet wires therein, the mating portions configured to mate with contacts of a mateable connector;
a cover having contact receiving passages, the contact receiving passages having receiving portions which configured to receive the mating portions of the first terminals, mateable connector receiving passages extending from the receiving portions, the mateable connector receiving passages dimensioned to receive the contacts of a mateable connector therein;
wherein the electrical connector assembly provides an electrical connection between the magnet wires and a harness connected to the mateable connector.

10. The electrical connector assembly of claim 9, wherein the first housing has projections which extend from the first housing to cooperate with openings of the motor assembly to maintain the first housing in position relative to the motor assembly.

11. The electrical connector assembly of claim 9, wherein the first housing has magnet wire receiving passages which extend from the terminal receiving passages, each magnet wire receiving passage having a longitudinal axis which is essentially perpendicular to the longitudinal axis of a respective terminal receiving passage.

12. The electrical connector assembly of claim 11, wherein lead wire receiving passages extend from the terminal receiving passages, the lead wire receiving passages have longitudinal axes which are essentially perpendicular to the longitudinal axis of the terminal receiving passages, the lead wire receiving passages are positioned above the magnet wire receiving passages to receive lead wires therein.

13. The electrical connector assembly of claim 11, wherein an insulating flange projects from the first housing, the insulating flange being positioned below the magnet wire receiving passages.

14. The electrical connector assembly of claim 12, wherein the first terminals have resilient spring contacts configured to resiliently engage second terminals attached to the lead wires.

15. The electrical connector assembly of claim 14, wherein the second terminals have tab poke-in portions with two legs and a recess positioned therebetween.

16. The electrical connector assembly of claim 9, wherein the cover has a first receiving area to receive a portion of the first terminals, resilient latch arms extend from either side of the cover, the resilient latch arms having latching projections which cooperate with recesses of the first housing when the cover is assembled to the first housing.

17. The electrical connector assembly of claim 16, wherein a portion of a wall of the cover extends over trim blocks of the first housing and associated ends of the magnet wires.

18. The electrical connector assembly of claim 9, wherein a bi-metal protector is provided.

19. An electrical connector assembly, comprising:
a first housing having first terminals which are secured in terminal receiving passages of the first housing, the first terminals are configured for receiving a magnet wires therein and for mating with contacts of a mateable connector;
a cover having contact receiving passages, the contact receiving passages and mateable connector receiving passages, the contact receiving passages having receiving portions to receive portions of the first terminals, the mateable connector receiving passages receive the contacts of a mateable connector therein;
a bi-metal protector, the bi-metal protector engaging respective first terminals;
wherein the electrical connector assembly provides an electrical connection between the magnet wires and a harness connected to the mateable connector.

20. The electrical connector assembly of claim 19, wherein lead wire receiving passages extending from the terminal receiving passages for receiving lead wires therein, the first terminals having resilient contacts configured to resiliently engage second terminals attached to the lead wires.

* * * * *